April 15, 1924.
W. L. FLEISHER
METHOD FOR DESICCATION
Filed Nov. 11, 1920
1,490,208
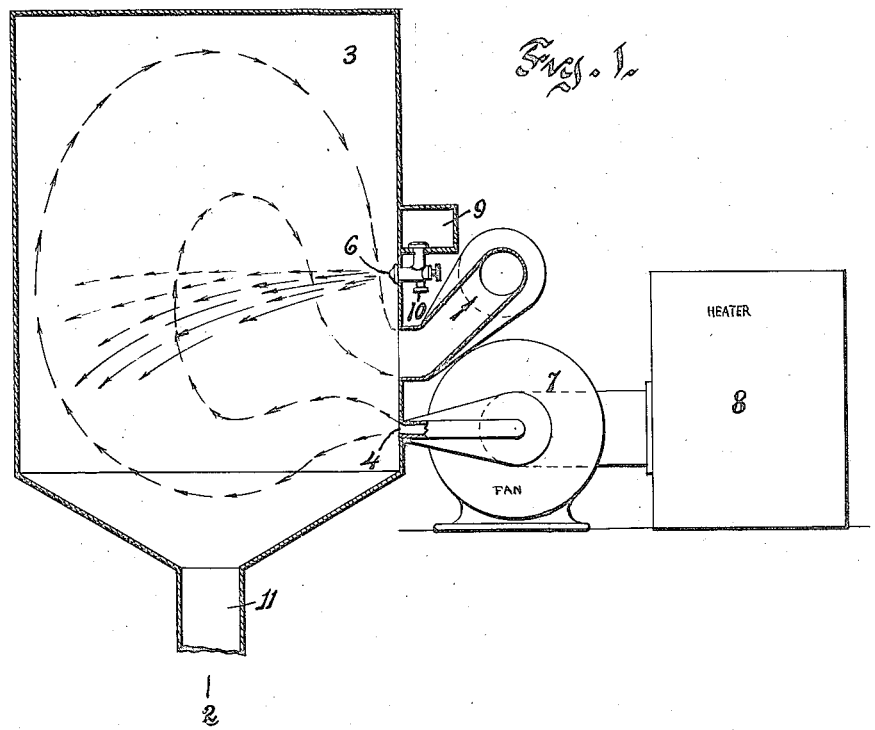
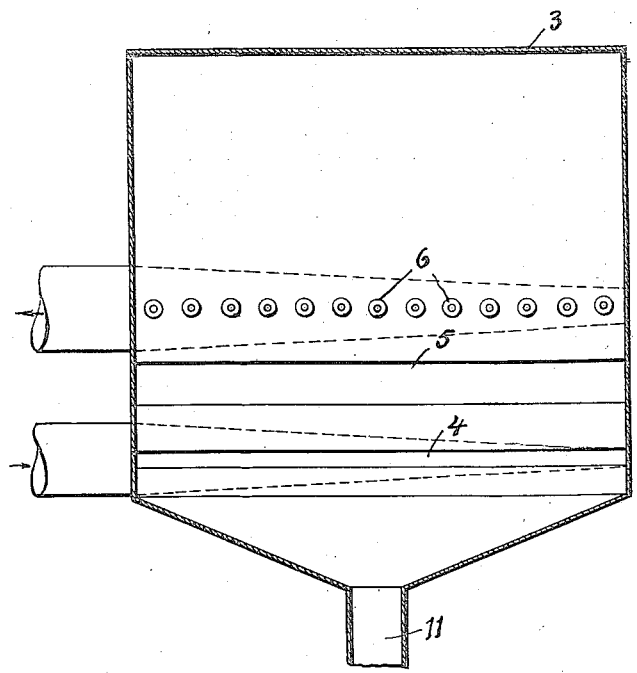
INVENTOR
W. L. FLEISHER.
BY
ATTORNEY Patented Apr. 15, 1924.

1,490,208

UNITED STATES PATENT OFFICE.

WALTER L. FLEISHER, OF NEW YORK, N. Y., ASSIGNOR TO AMERICAN DRYING PROCESSES, INC., OF NEW YORK, N. Y., A CORPORATION OF NEW YORK.

METHOD FOR DESICCATION.

Application filed November 11, 1920. Serial No. 423,475.

*To all whom it may concern:*

Be it known that I, WALTER L. FLEISHER, a citizen of the United States, and a resident of the city, county, and State of New York, have invented a new and Improved Method for Desiccation, of which the following is a full, clear, and exact description.

An object of my invention is to provide, a simple, inexpensive and efficient method for desiccating substances which can be sprayed.

In my method the drying or desiccating agent is an air current circulated to form substantially a hollow cylinder through which the substance to be desiccated is atomized so that the said substance passes through the hollow of the cylinder by entering laterally of the cylinder from the outside, and in a plane parallel to the elements of the cylinder. The substance is atomized to enter substantially in the form of a flat sheet.

In the accompanying drawing forming part of the application, Figure 1 represents a diagrammatic, sectional view through a form of an apparatus suitable for my method and Figure 2 shows a vertical section through Figure 1 on line 2—2.

In all types of spray driers a great difficulty is encountered in preventing the effluent air from carrying away therewith a large quantity of dust formed by the small particles of the substance to be dried. Another difficulty is encountered in the spray drying by the scale formation or case-hardening due to the contact of the hot dried air with the spray which produces particles having a hard shell and a soft core and which in consequence are not perfectly dried.

In my method of spray drying the arrangement is such that the air is so circulated that the hottest or dryest air contacts with the spray which has already been in contact with air not so hot or dry. In other words, the hottest or dryest air in my arrangement acts on particles of the spray partially dried. In consequence, the case-hardening of the particles is prevented. Further than that, the air that has already absorbed some of the moisture from the particles, as it approaches its exit strikes the spray nearer the nozzle, and in consequence most of the dust in the effluent air is washed down, thereby reducing considerably the dust in the effluent air and increasing the size of the particles formed within the spray drier.

Referring to the drawing, 3 is a desiccating chamber which has an elongated air inlet 4, preferably extending across the entire chamber, (see Figure 2) and located preferably in proximity to the bottom of the chamber. The chamber 3 has an elongated air outlet 5 located on the same side and extending also through the entire width of the chamber. The said outlet 5 is near the inlet and the direct rise of the air from the inlet to the outlet is prevented by the velocity imparted to the air which causes the entering layer of air to shape itself in a substantially hollow cylinder. The thickness of the air layer or wall of the air cylinder within the chamber 3 will vary from the inlet to the outlet due to the sudden expansion of the entering air layer and subsequent contraction when the air leaves the chamber 3 through the inlet 5. In consequence, the velocity of the air at the inlet and outlet is greater than at any point between the same, the minimum velocity being in the thickest part of the layer forming the substantially cored cylinder.

A series of nozzles 6 are located within the chamber 3, on the same side with the inlet and the outlet and slightly above the outlet 5. The nozzles are arranged in a row extending substantially through the entire width of the chamber and preferably parallel with the outlet opening. The row of nozzles is adapted, in combination, to produce a flat sheet of the atomized substance directed to intersect the hollow cylinder formed by the drying air circulated through the chamber 3. (See Figure 1.) This spray enters laterally of the cylinder and in a plane parallel to the elements of the cylinder, or, in other words, the spray in form of a sheet enters the hollow cylinder in a plane passing substantially parallel to the elements of the cylinder and in a direction substantially at right angles to the elements of the cylinder.

The air current is forced through the inlet 4 into the chamber 3, by a fan 7 which receives its air from a suitable heater 8, adapted to preheat the air drawn by the fan 7. The nozzles 6, are fed from a tank 9, with the matter to be desiccated. A suitable air connection 10 is provided for the nozzles to form a desired spray within the chamber 3 or pressure nozzles may be used if so desired. The velocity of the spray formed within the chamber is such that the same should not be strong enough to pass entirely across the hollow or cored air cylinder formed by the drying air within the chamber.

It must be understood that the hollow cylinder in cross section may be of any configuration. As shown in the drawing it is substantially of an oval shape. The gap that is shown between the inlet and the outlet in reality is very small due to the induction caused by the circulating current and eddies formed therein. The depression of the entering air layer shown in Figure 1 is due to the eddies formed within the hollow of the cylinder.

From the drawing and the description it will be seen that the entering air attacks that part of the spray which has already been in contact with air previously in contact with the spray. In other words, the entering spray first comes in contact with the air nearer to the outlet, that is with the air which is not as dry as the entering air, thereby preventing scale formation, thus increasing the size of the dried particles.

In view of the fact that the spray passes across the air cylinder formed it may be said that the particles of the spray are first treated with somewhat moist air and then with dry air, in consequence, increasing the efficiency of the spray drier and producing a better commercial product and reducing the expense of collecting the dust carried by the effluent air.

As previously stated the velocity of the spray is such that the same cannot pass entirely across the cylinder so that the entire spray will be under the action of the air current and the dry particles formed collect within the chamber at the bottom thereof where a suitable outlet 11 for the dried particles is provided. It will be noted that the spray intersects the air cylinder formed in planes substantially parallel to the elements of the cylinder, or in other words, parallel to the major axis of the cylinder if it has one, and the spray moves transversely of the elements of the cylinder.

It must be understood that although the description and drawing refer to an arrangement in which the air inlet and the air outlet and the nozzles are disposed in a horizontal plane, the same can be disposed in any other plane provided the relation is such that the inlet, the outlet and the row of nozzles are in parallel planes.

In other words, the air cylinder may be formed vertically in lieu of horizontally as shown. It is self evident that the relation between the inlet, the outlet and the row of nozzles will remain the same; that is to say, the air outlet is located between the row of nozzles and the air inlet.

I claim:

1. A method of desiccation, which consists in creating an air current in the form of a cylinder having a gap formed by the incoming and the effluent air, and forcing a spray of substance to be desiccated in the form of a sheet from the outside of the cylinder, the sheet of spray moving in a plane passing substantially parallel to the elements of the cylinder, and the direction of the spray being substantially at right angles to said elements.

2. A method of desiccation which consists in creating an air current in the form of a hollow cylinder having a gap formed by the incoming and effluent air currents, and forcing an atomized substance in the form of a sheet from the outside of the cylinder so that the said atomized substance moves in a plane parallel to the elements of the cylinder, and the direction of the spray being substantially at right angles to the elements of the said cylinder, said spray entering the said cylinder in proximity of the effluent side of the gap.

WALTER L. FLEISHER.